United States Patent
Liu

(10) Patent No.: US 10,480,955 B2
(45) Date of Patent: Nov. 19, 2019

(54) TRAVEL TIME MAPPING USING ISOCHRONES

(71) Applicant: Mapbox, Inc., San Francsico, CA (US)

(72) Inventor: Peter Qi Liu, San Francisco, CA (US)

(73) Assignee: Mapbox, Inc., San Francisco, CA (US)

( * ) Notice: Subject to any disclaimer, the term of this patent is extended or adjusted under 35 U.S.C. 154(b) by 89 days.

(21) Appl. No.: 15/849,232

(22) Filed: Dec. 20, 2017

(65) Prior Publication Data

US 2019/0186946 A1 Jun. 20, 2019

(51) Int. Cl.
| | | |
|---|---|---|
| *G01C 21/00* | (2006.01) | |
| *G06F 3/00* | (2006.01) | |
| *G06T 11/60* | (2006.01) | |
| *G01C 21/36* | (2006.01) | |
| *G06F 3/0482* | (2013.01) | |
| *G06F 3/0481* | (2013.01) | |
| *G06F 3/0484* | (2013.01) | |

(52) U.S. Cl.
CPC ..... *G01C 21/3676* (2013.01); *G01C 21/3697* (2013.01); *G06F 3/0482* (2013.01); *G06F 3/04817* (2013.01); *G06F 3/04842* (2013.01); *G06T 11/60* (2013.01)

(58) Field of Classification Search
CPC ........ G01C 21/00; G01C 21/26; G01C 21/34; G01C 21/3676; G01C 21/3697; G06F 3/00; G06F 3/04817; G06F 3/0482; G06F 3/04842; G06T 11/00; G06T 11/60; G08G 1/16
See application file for complete search history.

(56) References Cited

U.S. PATENT DOCUMENTS

| | | | |
|---|---|---|---|
| 9,134,137 B2 * | 9/2015 | Brush | G01C 21/3484 |
| 9,746,336 B2 * | 8/2017 | Rutten | G01C 21/36 |
| 2010/0087230 A1 * | 4/2010 | Peh | G06F 3/04817 455/566 |
| 2012/0158289 A1 * | 6/2012 | Bernheim Brush | G01C 21/3484 701/425 |
| 2015/0339397 A1 * | 11/2015 | Brush | G01C 21/3484 701/423 |

(Continued)

OTHER PUBLICATIONS

Liu, P., "A new kind of map: it's about time," Points of Interest, Sep. 15, 2017, 8 Pages, Can be retrieved from the Internet <URL:https://blog.mapbox.com/a-new-kind-of-map-its-about-time-7bd9f7916f7f>.

(Continued)

*Primary Examiner* — Yonel Beaulieu
(74) *Attorney, Agent, or Firm* — Fenwick & West LLP

(57) ABSTRACT

A method for displaying location information on a display of an electronic device as part of a graphical user interface involves accessing a reference geographical location. The method further involves receiving a set of geographical destinations, each destination of the set of destinations comprising a name and a location. The method further involves determining a set of travel times between the reference geographical location and each of the locations associated with the destinations in the set. The method further involves generating for display in a map display region of the graphical user interface a reference graphical element, a set of isochrone graphical elements, and a set of destination graphical elements.

20 Claims, 13 Drawing Sheets

(56) References Cited

U.S. PATENT DOCUMENTS

2016/0358471 A1* 12/2016 Hajj ................... G01C 21/3423
2018/0299287 A1* 10/2018 Brush ................ G01C 21/3484

OTHER PUBLICATIONS

Mapzen, "Range far and wide with Mapzen Isochrone," Blog, Nov. 17, 2016, 3 Pages, Can be retrieved from the Internet <URL:https://mapzen.com/blog/introducing-isochrone-service/>.

* cited by examiner

ND ISOCHRONES

TECHNICAL FIELD

The disclosure relates generally to the field of generating electronic maps and specifically to the arrangement and content of graphical user interfaces displaying electronic maps on display screens of computing devices.

BACKGROUND

Digitally stored electronic maps are used to provide directions to users of mobile and other computing devices, for example, using any of a wide array of standalone map or direction application programs or apps. Today's electronic maps correctly determine where a mobile device is within a few feet or meters, and can show where the user of that mobile device is on the electronic map in real time. Additional elements such as traffic or wrecks may also be shown.

Electronic maps also appear in other applications aside from standalone mapping applications. For example, ride sharing applications, taxi applications, video games, and other applications may use electronic maps. These or other applications can obtain electronic maps by calling a map server computer through an Application Programming Interface (API). Thus, a single electronic map provider that owns or operates the server computer may supply the electronic maps for many different applications.

SUMMARY

In many use cases of electronic maps it is desirable to choose a destination based on travel time. For example, when choosing what to eat for lunch, a businessperson may wish to find a restaurant within a certain walking distance of his or her office. In such scenarios it is less useful to know the geographical distance of a destination than it is to know the time it takes to get there. Electronic maps may therefore inadequately provide information because of their focus on spatial, rather than temporal, distance.

Electronic maps are generally geographical maps, representing spatial aspects of a given area. Attempts to display travel times to various destinations are constrained by the spatial composition of such electronic maps. A system with an electronic map comprising a time map, with a well-designed corresponding graphical user interface (GUI), allows for more understandable and useful mapping of travel times to various destinations to better allow route planning with consideration for temporal factors.

As one example embodiment, a system includes at least one processor which generates for display on a display screen as part of a GUI a time map comprising a temporal representation of a given area. The GUI generated by the system may comprise a map display region on which the locations of various destinations are represented relative to a reference geographical location, such as the user's location, primarily by a measure of travel time to each destination. The time map may further comprise isochrone graphical elements to better indicate the various travel times. Additional aspects of the system may comprise an action display region which in turn comprises actionable graphical elements, allowing further functionality. For example, a first actionable graphical element could allow the user to change the reference geographical location to something other than the user's location.

In one embodiment, a first method involves accessing the user's geographical location to set the reference geographical location, then receiving a set of geographical destinations near the reference geographical location. The first method may further involve determining a set of travel times corresponding to the set of geographical destinations, and generating for display within the map display region elements representing the geographical destinations, located on the time map relative to the user and the corresponding travel times.

In the same or a different embodiment, the first method is followed by a second method, wherein user selection of a destination is identified, for example, when the user uses a cursor to click on a destination graphical element, or to select a destination from a list in the action display region. The second method may then further comprise determining a set of directions from the reference geographical location to the selected destination and a corresponding geographical representation of the set of directions. Further, the electronic map may change to display a geographic map on which the geographical representation of the set of directions is plotted and then displayed. The set of directions can also be displayed elsewhere, for example, in list format in the action display region.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

I. System Overview

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
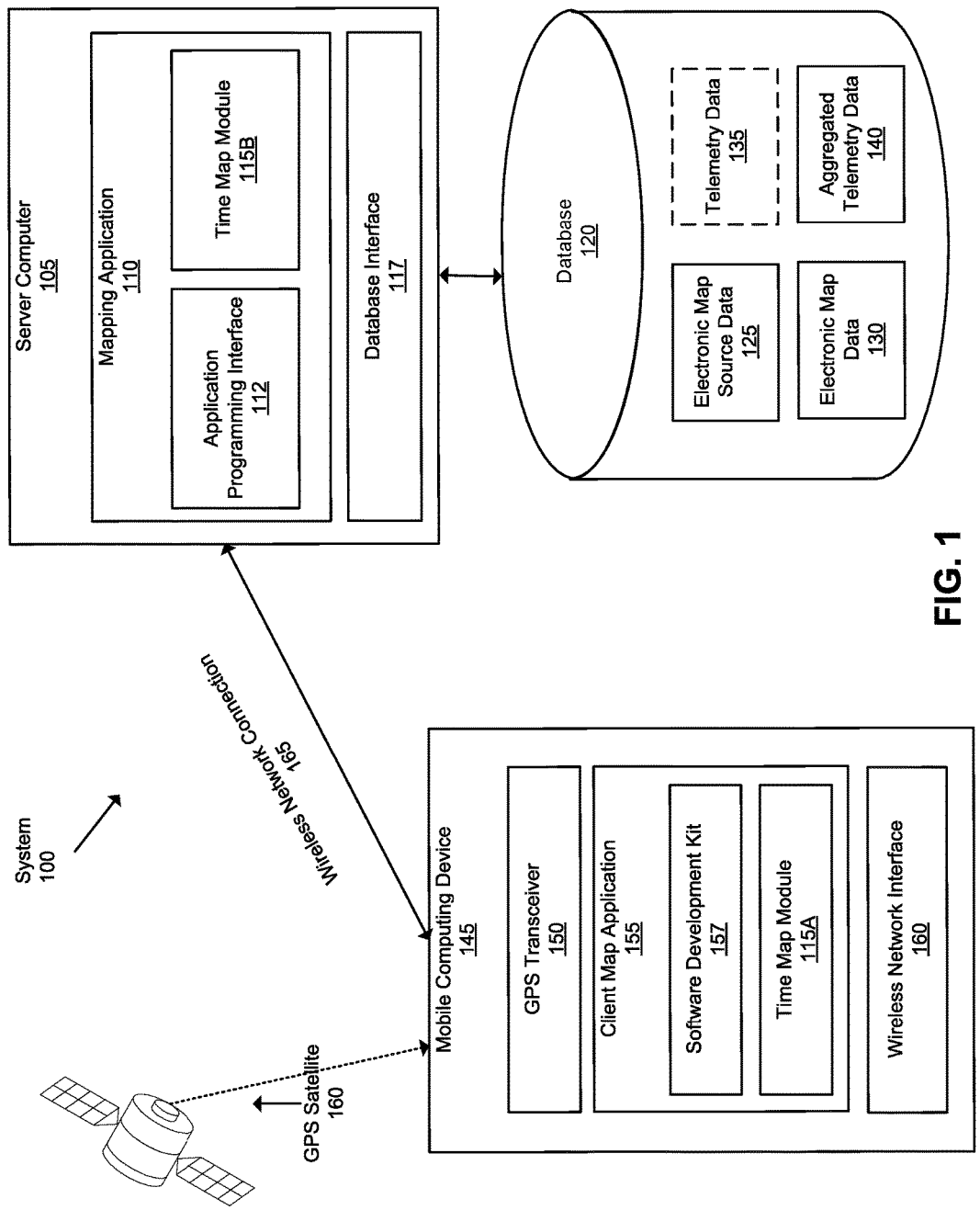
FIG. 1 illustrates an example computer system in which the techniques described may be practiced, according to one embodiment.

Computer-implemented techniques are provided for generating electronic maps with travel time mapping using isochrones. Herein, "isochrone" refers to a graphical feature of a map representing a travel time from a reference location, where the spatial representation of the isochrone on the map communicates time, rather than geography. This is in contrast to the preexisting mapping method of overlaying travel times upon a geographical map, where the placement of isochrones is bound to the geography of the map. FIG. 1 illustrates an example computer system in which the techniques described may be practiced, according to one embodiment.

FIG. 1 uses like reference numerals to identify like elements. A letter after a reference numeral, such as "115A," indicates that the text refers specifically to the element having that particular reference numeral. A reference numeral in the text without a following letter, such as "115," refers to any or all of the elements in the figures bearing that reference numeral. For example, "115" in the text refers to reference numerals "115A," and/or "115B" in the figures.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite 160 is coupled via a wireless connection to the mobile computing device 145. The server computer 105 comprises a mapping application 110, an application programming interface (API) 112, a time map module 115B and a database interface 117. The database 120 comprises electronic map source data 125, electronic map data 130, telemetry data 135, and aggregated telemetry data 140. The mobile computing device 145 comprises a GPS transceiver 150, client map application 155, software development kit (SDK) 157, time map module 115A, and wireless network interface 160.

I.A. Server and Database

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or more nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

In one embodiment, electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

I.B. Mobile Computing Device

In one embodiment, mobile computing device 145 is any mobile computing device, such as a laptop computer, handheld computer, wearable computer, cellular or mobile phone, portable digital assistant (PDA), or tablet computer. Alternatively, mobile computing device 145 could be a desktop computer or an interactive kiosk. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 160 which is used by the mobile computing device to communicate wirelessly with other devices. In particular, wireless network interface 160 is used to establish wireless network connection 165 to server computer 105. Wireless network interface 160 may use WiFi, WiMAX, Bluetooth, ZigBee, cellular standards or others.

Mobile computing device 145 also includes time map module 115A which is used by the mobile computing device as part of the client map application 155 to provide time map functionality. In some embodiments time map module 115A collaborates with time map module 115B of the server computer 105 to provide time map functionality. Alternatively, either time map module 115A or time map module 115B solely provides time map module functionality, in which case the other module may not be present in the system.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device 145. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, receiving electronic map source data 125 from data providers, processing electronic map source data 125 to generate electronic map data 130, and any other aspects of embodiments described herein. Mapping application 110 includes time map module 115B which may be used to enable time map functionality on client map application 155. Depending upon embodiment, time map functionality may be provided wholly on the mobile computing device 145 via time map module 115A, wholly on the server computer 105 via time map module 115B, or in part by each time map module 115 working in conjunction.

I.C. Hardware Environment

According to one embodiment, the techniques described herein are implemented by one or more special-purpose computing devices. For example, the server computer 105 and mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
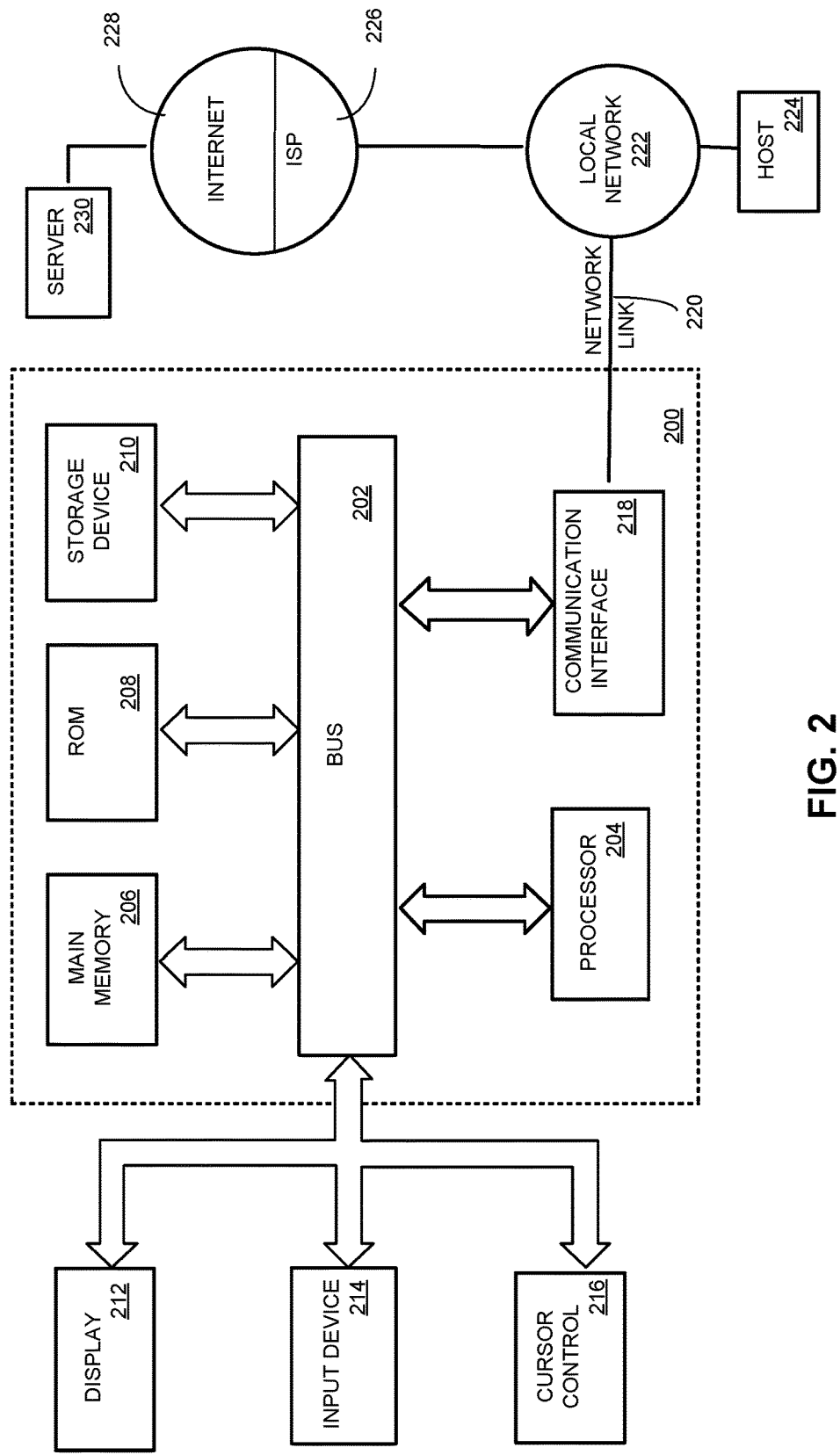
FIG. 2 is a block diagram that illustrates a computer system upon which an embodiment of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as an LCD screen, LED screen, or touch screen, for displaying information to a computer user. An input device 214, which may include alphanumeric and other keys, buttons, a mouse, a touchscreen, and/or other input elements is coupled to bus 202 for communicating information and command selections to processor 204. In some embodiments, the computer system 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received, and stored in storage device 210, or other non-volatile storage for later execution.

II. Graphical User Interface and Processes

Figure 3:
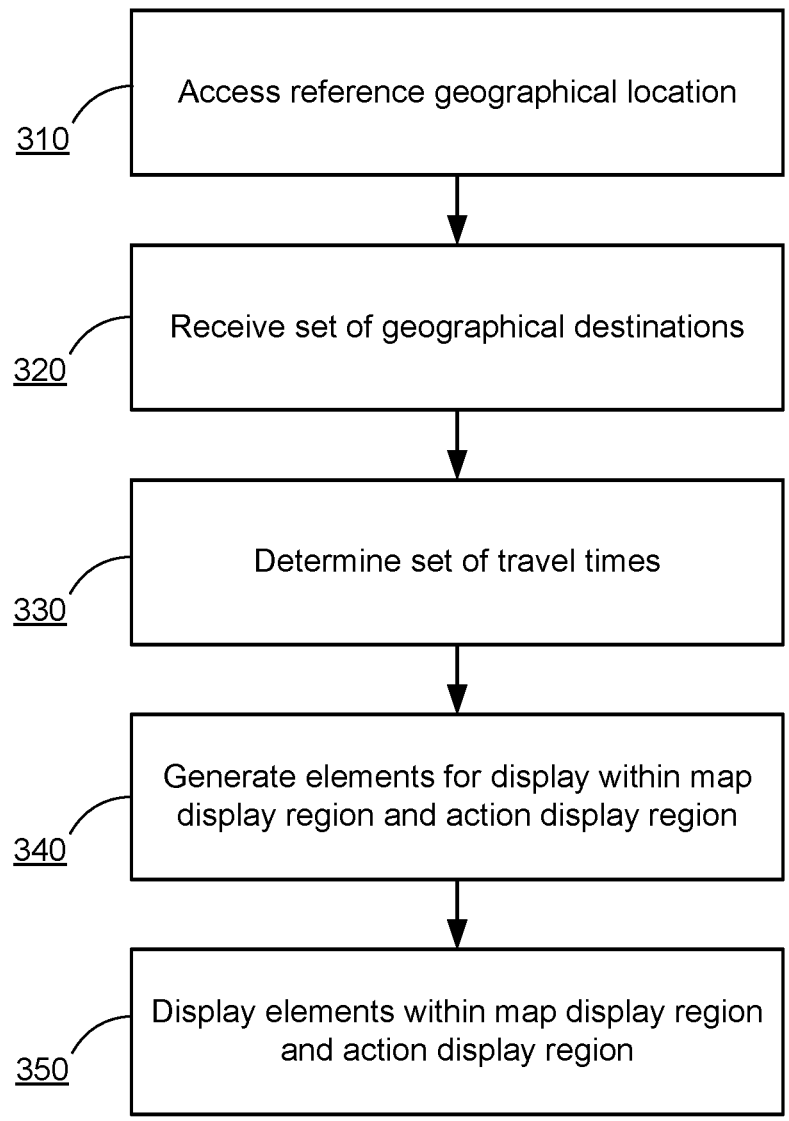
FIG. 3 shows a process for generating and displaying a time map, according to one embodiment.

FIG. 3 shows a process 300 for generating and displaying a time map, according to one embodiment. In various embodiments, the operations of the process 300 of FIG. 3 may be implemented in programming by a server computer 105 or its components as described supra, or by a mobile computing device 145 or its components as described supra, or a combination of server computer 105 and mobile computing device 145 or their components. Additionally or alternatively, the process 300 may be carried out by special-purpose hardware on a server computer 105, mobile computing device 145, or combination thereof. In some embodiments, execution of the process 300 causes interaction between the server computer 105 and the database 120.

Figure 4:
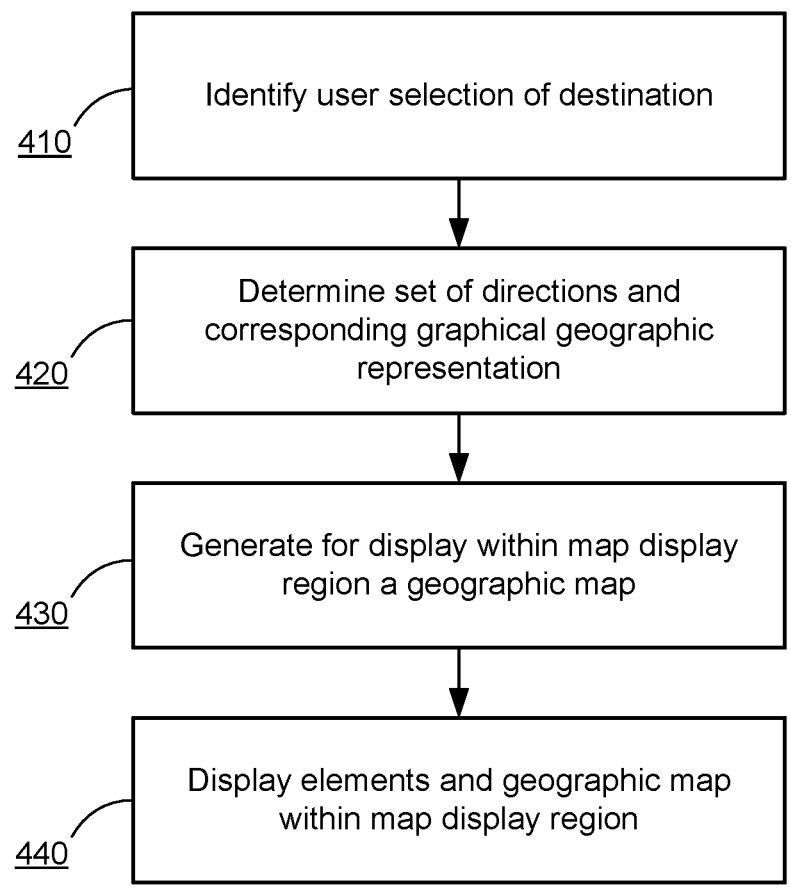
FIG. 4 shows a process for dynamically transitioning a time map into a geographic map, according to one embodiment.

FIG. 4 shows a process for dynamically transitioning a time map into a geographic map, according to one embodiment. In various embodiments, the operations of the process 400 of FIG. 4 may be implemented in programming by a server computer 105 or its components as described supra, or by a mobile computing device 145 or its components as described supra, or a combination of server computer 105 and mobile computing device 145 or their components. Additionally or alternatively, the process 400 may be carried out by special-purpose hardware on a server computer 105, mobile computing device 145, or combination thereof. In some embodiments, execution of the process 400 causes interaction between the server computer 105 and the database 120.

Figure 5:
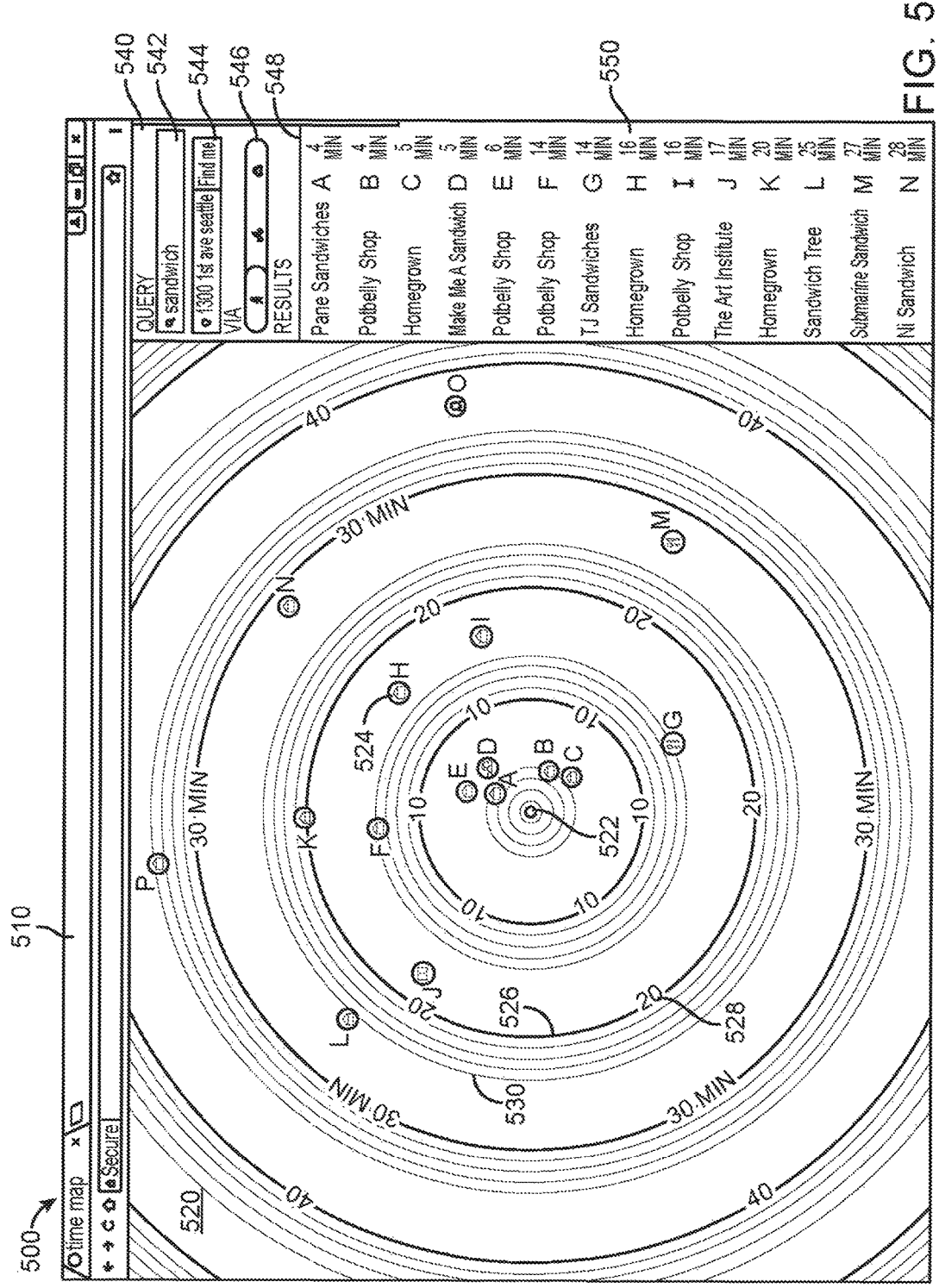
FIG. 5 illustrates the graphical user interface of an example implementation, according to one embodiment.

FIG. 5 illustrates a graphical user interface (GUI) 500 of an example implementation, according to one embodiment. The GUI 500 is displayed to the user via the mobile computing device 145 and is part of the client map application 155. The GUI 500 may be partially or wholly implemented by the time map module 115. For example, the GUI 500 could be implemented as a web page accessible using a browser application on a mobile computing device 145 according to programming within the time map module 115 and using data stored in the database 120. In other embodiments the GUI 500 is instead an interface as part of a software application or computer program product.

FIG. 5 comprises a browser 510 used to support display of the GUI 500. The GUI 500 comprises a map display region 520 and an action display region 540. The map display region 520 displays map graphical elements, whether spatial or temporal in nature, such as icons, labels, and so on. Users may interact with various elements of the map display region 520, for example, by selecting them with a cursor. The action display region 540 displays actionable graphical elements which further elucidate aspects of the map display region 520 and/or provide additional interactivity with the map display region, or elements thereof, to the user.

Returning to FIG. 3, at 310, the time map module 115 accesses a reference geographical location. The mobile computing device 145 provides geographical location information to the client map application 155, using the GPS transceiver 150 to receive the geographical location information from the GPS Satellite 160. Alternatively, geographical location information could come from other techniques such as a Wi-Fi Positioning System. The client map application 155 provides the geographical location information to the time map module 115. The time map module 115 uses the geographical location information as the reference geographical location, which acts as a starting point for generating the time map. Alternatively, the reference geographical location could be set by the user or the time map module 115 to a different geographical location.

The reference geographical location is represented within FIG. 5 by a reference geographical element 522. The rest of the time map is generated in relation to the reference geographical element 522, for example, a time map corresponding to a certain geographical area surrounding the reference geographical location. In FIG. 5, the reference geographical element 522 comprises a circular icon within the map display region. Depending upon the embodiment, the reference geographical element 522 may be visually distinguishable from other graphical elements by comprising a certain color, pattern, or shape, or one or more other distinguishing features, or any combination thereof.

At 320, the time map module 115 receives a set of geographical destinations. A geographical destination is a point of interest to which a user may wish to travel, such as a restaurant or a business, and comprises a geographical location. The geographical location may be in the form of a latitude and a longitude, for example. A geographical destination can further comprise a name. For example, a geographical destination which is a restaurant called "Make Me a Sandwich." The set of geographical destinations received by the time map module 115 are destinations which are within a certain spatial distance or travel time of the reference geographical location. The set may be trimmed to include only those destinations which meet certain requirements, such as being a certain class of destination. For example, the set of geographical destinations may comprise only destinations no more than a 30 minute walk from the reference geographical location, and which also are shops which sell sandwiches. The set of geographical destinations may originate from data stored in the database 120 as electronic map data 130, which are queried to produce the set, which is then sent to and received by the time map module 115.

At 330, the time map module 115 determines a set of travel times. The set of travel times corresponds with the set of geographical destinations on a one to one basis, each geographical destination having an associated travel time. Each travel time is the time it takes to travel from the reference geographical location to the geographical destination associated with the travel time. Travel time depends upon a method of transportation, for example, walking, running, bicycling, or driving. Travel time may further depend upon factors such as day of the week, time of day, live traffic information, and/or incident reports such as road closures. A specific method of transportation is used when determining travel times, and in some embodiments the user may change the method of transportation, thereby inducing a redetermination of travel times to take into account the changed method of transportation. The system can adjust to accommodate changes in travel times, for example, by relocating graphical elements to maintain their relativity.

At 340, the time map module 115 generates elements for display within the map display region 520 and action display region 540. As seen in FIG. 5, the map display region 520 comprises a plurality of graphical elements, such as the reference graphical element 522, a destination graphical element 524, an isochrone graphical element 526, an isochrone label graphical element 528, and an interstitial isochrone graphical element 530. Furthermore, as seen in FIG. 5, the action display region 540 comprises a specify destination graphical element 542, a change location graphical element 544, a transportation graphical element 546, a destination list region 548, and a listed destination graphical element 550. These elements will be described further below in the following Section, Map Display Region Elements.

At 350, the system displays the generated graphical elements. FIG. 5 shows one embodiment exemplifying the overall GUI 500 at this step and its comprising regions and elements therein.

II.A. Map Display Region Elements

Destination graphical element 524 comprises a graphical icon representing a destination from the set of geographical destinations. Destination graphical element 524 is located within the map display region 520 relative to the reference graphical element 522 and the isochrone graphical elements to represent the travel time from the reference geographical location to the geographical location of the geographical destination associated with the destination graphical element 524. Destination graphical element 524 is one example of a destination graphical element, of which there may be a plurality. Destination graphical element 524 represents destination geographical location "Homegrown." As seen in the figure, the graphical element has an adjacent letter "H" which corresponds to the listed destination graphical element 550 within the destination list region 548. In one embodiment, the destination graphical element 524 and listed destination graphical element 550 comprise a letter label such as "H." In another embodiment, the destination graphical element 524 comprises the name of the destination geographical location, i.e. "Homegrown," and neither the destination graphical element 524 nor the listed destination graphical element 550 comprises the letter label.

Isochrone graphical element 526 lies within the map display region 520 and comprises a graphical element representing a travel time from the reference geographical location. The isochrone graphical element 526 is one example of an isochrone graphical element, of which there may be a plurality. Placement of the isochrone graphical element 526 within the map display region 520 is relative to the reference graphical element and, depending upon embodiment, can be relative to one or more destination graphical elements.

In one embodiment, each isochrone graphical element, e.g. isochrone graphical element 526, is placed equidistantly from the next, starting nearest the reference geographical element and continuing outward. For example, isochrone graphical elements may comprise circles of varying radii surrounding the reference graphical element, each isochrone graphical element representing a different travel time to destinations placed along that isochrone from the reference geographical location. For example, isochrone graphical element 526 represents in FIG. 5 a temporal distance of twenty minutes from the reference geographical location. Placement of destination graphical elements on isochrone graphical element 526 indicates a travel time of twenty minutes from the reference geographical location to the destination geographical locations represented by those destination graphical elements. More generally, isochrone graphical elements comprise closed shapes, and may be ovoids, polygons, etc. in different embodiments.

In an embodiment, each isochrone graphical element is associated with one or more destination graphical elements and is placed within the map display region 520 relative to the reference graphical element 522 and the one or more associated destination graphical elements, wherein the one or more associated destination graphical elements are located a travel time from the reference geographical location equal to the travel time of the associated isochrone. In this embodiment isochrone graphical elements are not necessarily placed at regular intervals from each other, nor represent equally different travel times. For example, in such an embodiment, destination graphical element 524 would have an associated isochrone graphical element representing its travel time from the reference geographical location, sixteen minutes, rather than laying between isochrone graphical elements as shown in FIG. 5.

Depending upon the embodiment, isochrone graphical elements have associated adjacent or overlapping labels within the map display region indicating the travel time of the isochrone. For example, in FIG. 5, isochrone graphical element 526 has associated isochrone label graphical element 528 indicating that geographical destinations represented by destination graphical elements plotted along the isochrone graphical element 526 are twenty minutes from the reference geographical location.

There may be varied types of isochrones. For example, some isochrones may be graphically more distinct than others, such as being represented by thicker lines. FIG. 5 is an example of this: every tenth-minute isochrone is represented by an isochrone graphical element thicker than the rest, whereas the other isochrone graphical elements are less thick. Interstitial isochrone graphical element 530, which represents a temporal distance equal to 24 minutes from the reference geographical location, is less thick than isochrone graphical element 526 which represents a temporal distance equal to 20 minutes from the reference geographical location. More generally, different isochrones may be grouped according to different rules and may be graphically distinguished from each other in one or more ways, for example, varying line thickness, or dashed versus solid lines.

There are a plurality of ways to graphically represent isochrones and depending upon the embodiment one or more ways may be used. Already detailed supra is the embodiment of graphically representing isochrones using circles of varying radii surrounding the reference graphical element 522, which is the embodiment seen in FIG. 5. Another option would be to represent the time map within the map display region as a line, with the reference graphical element 522 as a point on the line, where isochrones are graphically represented by demarcations upon the line. In such an embodiment destination graphical elements are likewise placed along the line relative to the reference graphical element and the isochrone graphical elements depending on each geographical destination's travel time from the reference geographical location.

In an embodiment, the location of a destination graphical element within the map display region relative to the reference graphical element 522 is dependent upon the bearing of the associated destination geographical location from the reference geographical location. For example, destination graphical element 524 is above and to the right of the reference graphical element 522 in FIG. 5. This placement could be because the geographical destination represented by destination graphical element 524 is North-East of the reference geographical location. Such bearing information is contained within the database 120 and can be obtained by the time map module 115. Alternatively, placement may be approximate with regard to the bearing of the associated destination graphical location from the reference geographical location. This may be done, for example, to reduce visual crowding of graphical elements upon the display when geographical locations being represented are close enough in proximity to one another that corresponding graphical elements would overlap and/or become difficult to distinguish otherwise.

II.B. Action Display Region Elements

The action display region 540 comprises elements which provide greater functionality with and/or detail regarding the map display region and elements thereof. Specify destination graphical element 542 comprises a field in which the user may enter via the system a specification term or terms to narrow or change the set of destinations, for example, using a keyboard communicatively coupled with the system. In an embodiment, each destination has a class, and the user may enter a class into the specify destination graphical element 542 to narrow the set of destinations to that class. For example, in FIG. 5, the specify destination graphical element 542 contains "sandwich" in an area of its specify destination graphical element 542. Hence the map display region displays only destination graphical elements corresponding to geographical destinations classified as sandwich vendors. If the user were to change "sandwich" to, for example, "coffee", the map display region would update to display destination graphical elements corresponding to geographical destinations classified as coffee shops. In an embodiment, the specify destination graphical element 542 comprises a list of classes from which the user may select at least one class to populate the map display region 520 with destination graphical elements corresponding to geographical destinations classified as at least one of the selected classes. In an embodiment, selection is done using a cursor.

Change location graphical element 544 comprises a field in which the user may enter a location to set the reference geographical location. If the user uses the change location graphical element 544 to change the reference geographical location, the process 300 for generating and displaying a time map restarts for the new reference geographical location. For example, if the reference geographical location is in San Francisco, and the user changes it to a location in New York, the system will have to receive a new set of geographical destinations, determine a new set of travel times, generate new elements for display, and display the new elements for the new reference geographical location in New York within the map display region 520. Elements within the action display region 540 would also update accordingly. Depending upon the embodiment the location may be entered as an address, a latitude and longitude, or other form of location description. In an embodiment, the location may be entered using a keyboard communicatively coupled with the system.

The transportation graphical element 546 allows the user to select a method of transportation. For example, the transportation graphical element 546 could comprise icons representing a human, implying transportation by walking; a bicycle, implying transportation by bicycle; and a car, implying transportation by car. Determination 330 of the set of travel times takes method of transportation into consideration. For example, a destination which a person could walk to in half an hour might be reachable by car in five minutes. If the user uses the transportation graphical element 546 to change the method of transportation, the set of travel times is recalculated, and the destination graphical elements and/or isochrone graphical elements are repositioned accordingly on the map display region 520. Likewise, relevant elements of the action display region 540 such as listed destination graphical elements would update if applicable. If necessary, destination graphical elements and isochrone graphical elements are regenerated responsive to the transportation graphical element 546 changing method of transportation. In an embodiment, the method of transportation may be selected using a cursor.

The destination list region 548 comprises one or more listed destination graphical elements, e.g. listed destination graphical element 550. Each listed destination graphical element comprises a name and a travel time, and corresponds with a destination graphical element. For example, listed destination graphical element 550 comprises the name "Homegrown" and a travel time "16 MIN". Furthermore, in the embodiment captured by FIG. 5, the listed destination graphical element 550 comprises a letter label "H" corresponding to the letter label of the corresponding destination graphical element 524 within the map display region, which is placed relative to the reference graphical element and the isochrone graphical elements to represent the 16 minute travel time from the reference geographical location to the associated geographical destination. Depending upon the embodiment, the destination list region 548 may not comprise a listed destination graphical element for each destination graphical element, such as when there is not enough space to display each listed destination graphical element within the GUI 500. Alternatively, in other embodiments, the map display region 520 may not comprise a destination graphical element corresponding to every listed destination graphical element, for example, when one or more destination graphical elements are located on the map in locations outside the area captured by the map display region 520. In such cases the one or more destination graphical elements not displayed may become displayed if the user pans the map display region in an appropriate direction an appropriate amount.

In an embodiment, an additional action display element is a start time graphical element. The start time graphical element allows the user to select a time of day and/or a day of the week at which to calculate travel time. This provides additional accuracy to the calculation. For example, a travel time from a residential house to an office in a downtown area can vary dramatically depending upon the day and time of travel. The travel time for such a trip on a Monday at 9:00 AM would almost certainly be much greater than the same trip on a Sunday at 1:00 AM. The map display region 520 can update to reflect new travel conditions imposed by the start time graphical element by relocating graphical elements appropriately for the new travel times.

III. Additional Map Display Region Features

Figure 6:
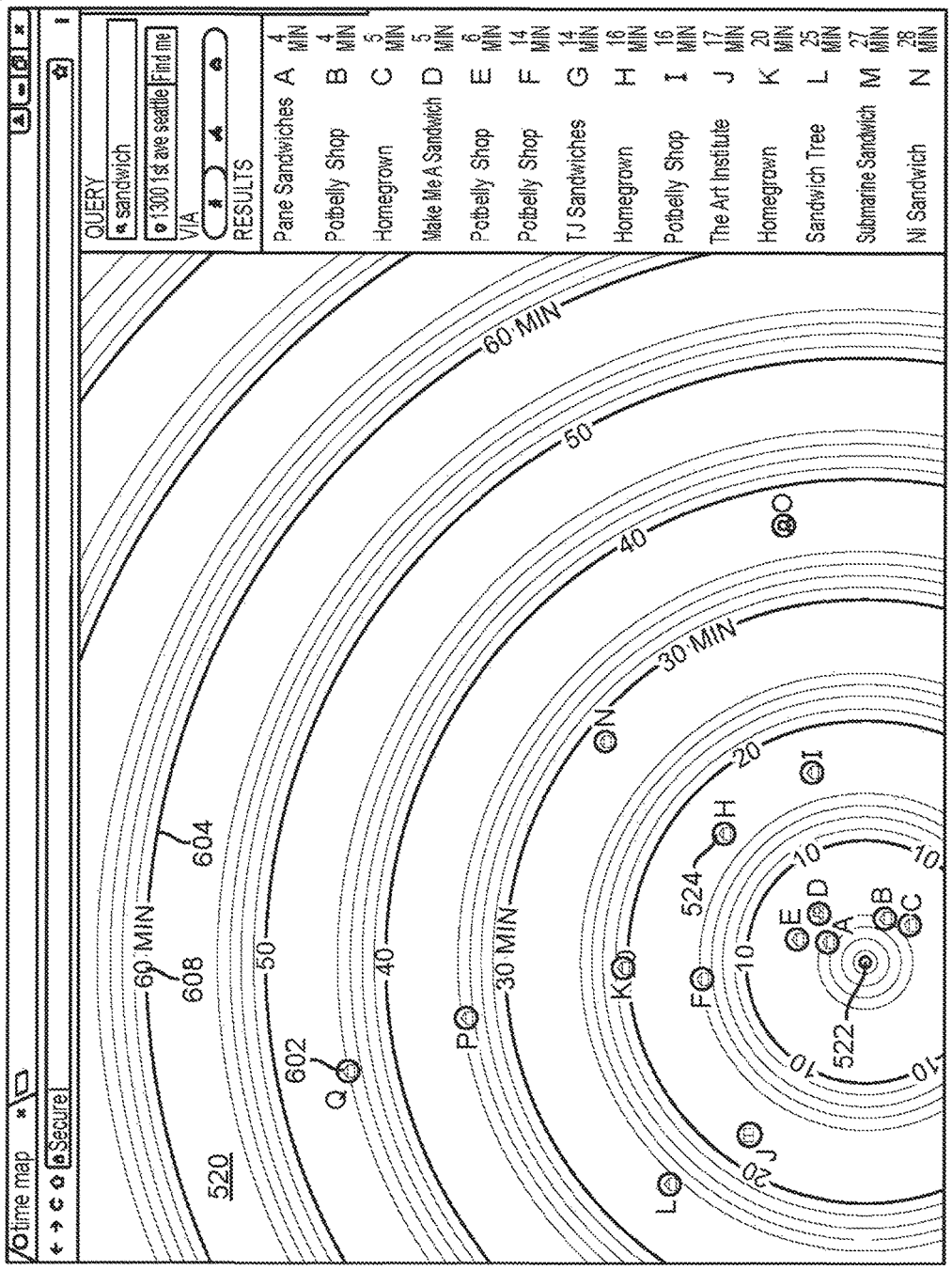
FIG. 6 illustrates a panning feature in the graphical user interface of an example implementation, according to one embodiment.

FIG. 6 illustrates a panning feature in the graphical user interface of an example implementation, according to one embodiment. In the example captured by FIG. 6, the user has panned the map display region 520 to display areas of the time map not previously visible within the map display region. Panning is conducted via one or more techniques, including using arrow keys on the keyboard, clicking and dragging the map display region with the cursor, using WASD keys, using graphical elements of the GUI such as pan buttons, etc. In FIG. 6 the reference graphical element 522 remains visible, yet after panning is now nearer a side of the map display region than in FIG. 5. Likewise, the other graphical elements have shifted towards that side, such as destination graphical element 524. Furthermore, graphical elements which were not previously visible have been made visible in this example, including destination graphical element 602, isochrone graphical element 604, and isochrone label graphical element 608. Depending upon the embodiment, the graphical elements visible only after panning are generated during process 300, or are generated dynamically as the user pans.

Figure 7:
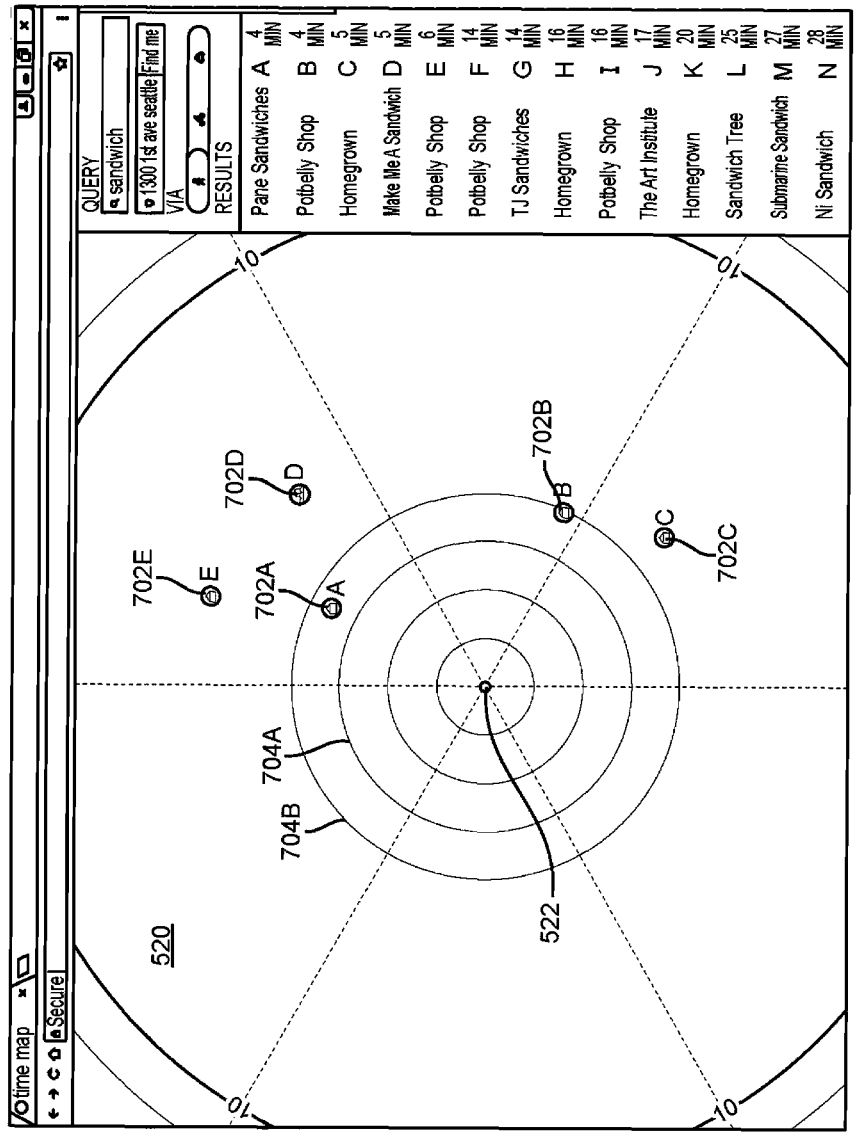
FIG. 7 illustrates a zoom in feature in the graphical user interface of an example implementation, according to one embodiment.

FIG. 7 illustrates a zoom in feature in the graphical user interface of an example implementation, according to one embodiment. In the example captured by FIG. 7, the user has zoomed in the map display region to display a smaller area of the time map than seen in FIG. 5. In so doing the map display region 520 provides a closer view of the zoomed in region. Graphical elements reposition responsive to the zooming in, spreading apart as the map display region zooms in and reduces the area displayed. For example, destination graphical elements 702A,702B,702C,702D, 702E on FIG. 5 are far more distinct on FIG. 7 than similar elements on FIG. 5, while maintaining their locations relative to each other, the reference graphical element 522, and the isochrone graphical elements. The isochrone graphical elements adjust to accommodate the new dimensions of the map display region, and like the destination graphical elements become more distinguishable from one another. For example, isochrone graphical elements 704A and 704B are more greatly separated on FIG. 7 than similar elements on FIG. 5. Hence, the zoom in feature provides the user with a closer and hence clearer view of a specific area of the time map. In an embodiment, the user zooms in by scrolling in a particular direction a wheel of a computer mouse communicatively coupled with the system.

Figure 8:
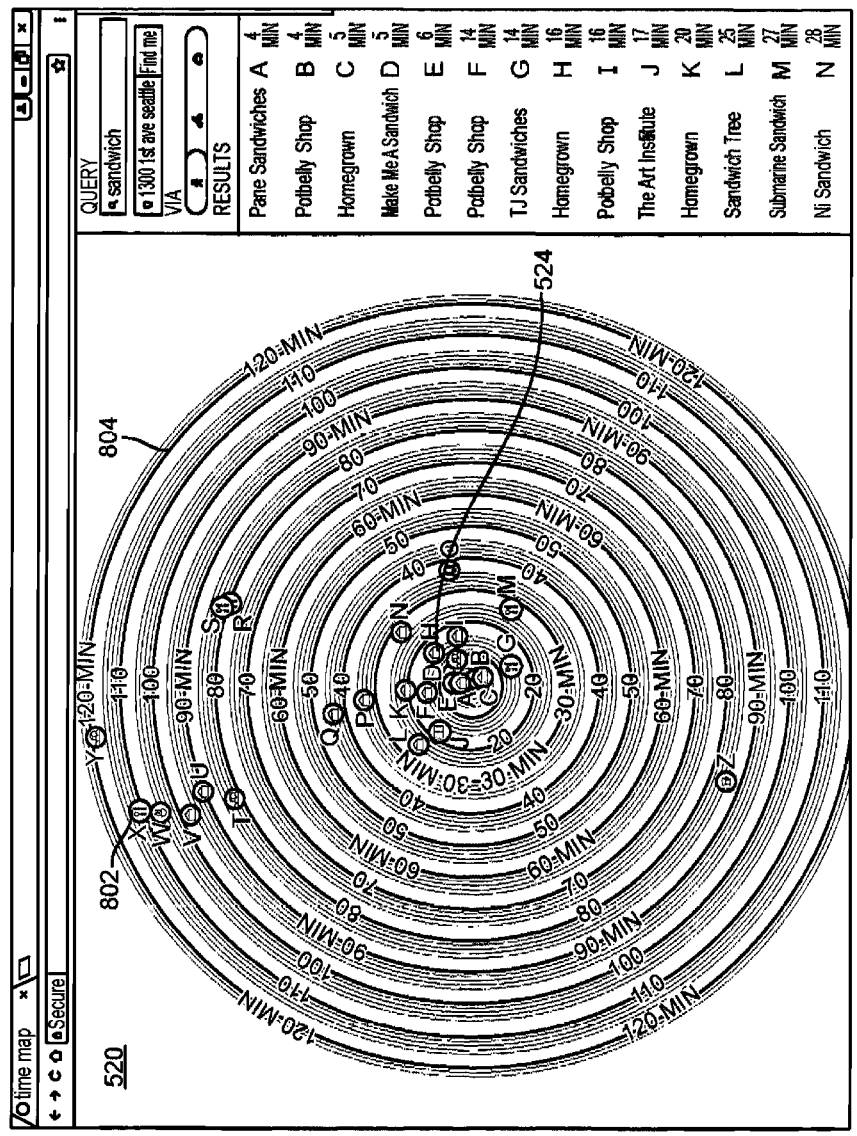
FIG. 8 illustrates a zoom out feature in the graphical user interface of an example implementation, according to one embodiment.

FIG. 8 illustrates a zoom out feature in the graphical user interface of an example implementation, according to one embodiment. In the example captured by FIG. 8, the user has zoomed out the map display region 520 display as large an area as its particular embodiment allows to be displayed. Zooming out increases the area captured by the map display region 520 and as such may cause the system to display previously undisplayed elements which were outside the area captured by the map display region 520 until the zoom out. Zooming out causes graphical elements to reposition within the map display region while retaining their locations relative to each other. For example, destination graphical element 524 is in a different area of the map display region 520 on FIG. 8 as compared to FIG. 5. Graphical elements which were not previously visible are made visible by zooming out, such as destination graphical element 802 and isochrone graphical element 804 in the example of FIG. 8. Zooming out causes graphical elements to visually move closer to one another, representing the greater area captured by the map display region. In an embodiment, the user zooms out by scrolling in a particular direction a wheel of a computer mouse communicatively coupled with the system.

IV. Additional Action Display Region Features

Figure 9:
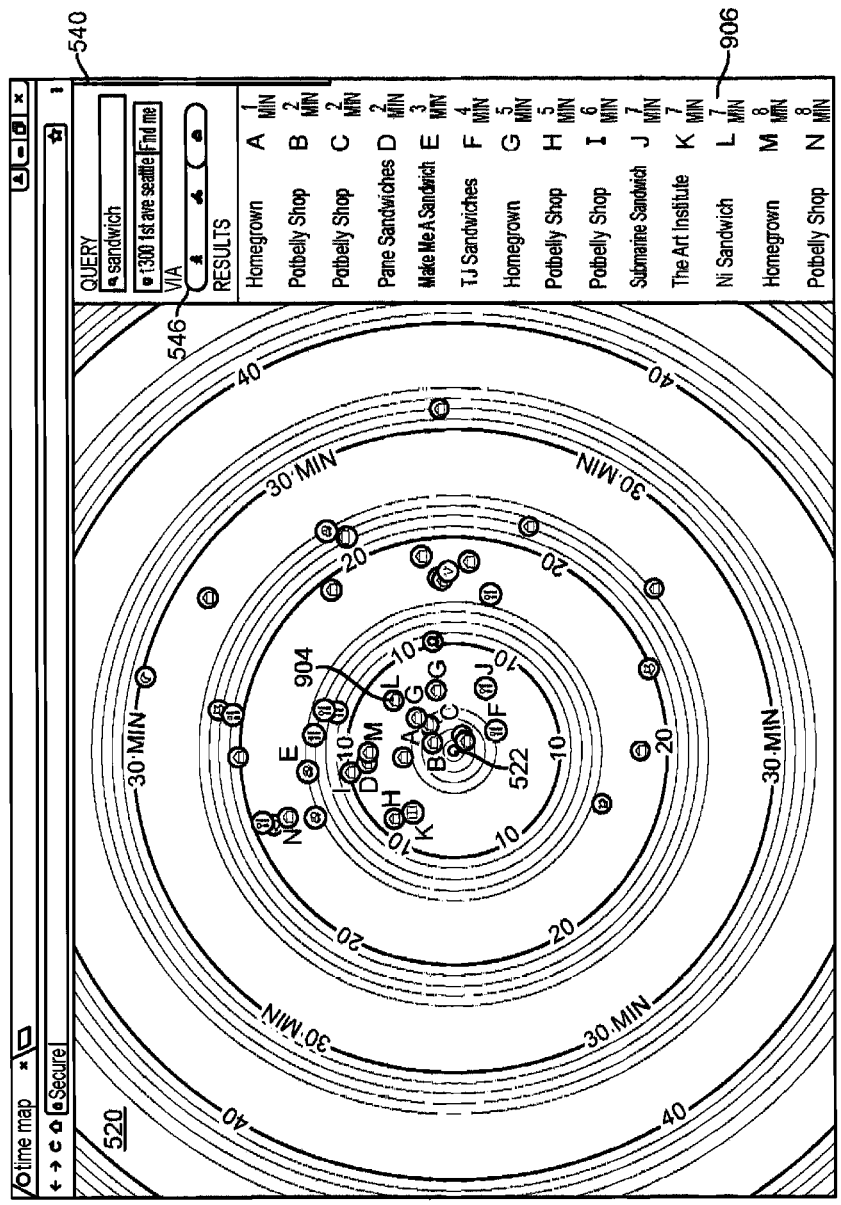
FIG. 9 illustrates a feature which allows change to the method of transit, in the graphical user interface of an example implementation, according to one embodiment.

FIG. 9 illustrates a feature which allows change to the method of transit, in the graphical user interface of an example implementation, according to one embodiment. As detailed supra, the transportation graphical element 546 allows the user to select a method of transportation. In the example captured by FIG. 9, the user has selected an icon representing a car as the method of transportation. As such the set of travel times is redetermined to incorporate the new method of transportation, car, altering and/or repositioning graphical elements of the map display region 520 and action display region 540. For example, destination graphical element 904 is placed within the isochrone graphical element representing a ten minute travel time, whereas in FIG. 5, the destination graphical element is placed far outside the same isochrone, all relative to the reference graphical element 522. This repositioning is due to the relative travel speed of the different methods of transit. Cars are much faster than humans. As such, travel times calculated with a car as the method of transportation are generally less than travel times calculated with human legs as the method of transit, as in FIG. 9 versus FIG. 5. The reduction of travel time captured by the rearrangement of destination graphical element 904 is also expressed in listed destination graphical element 906, where the travel time is "7 MIN." The listed destination graphical element representing the same geographical location on FIG. 5 has the travel time as "28 MIN." In an embodiment, the user changes method of transportation by selecting an icon with a cursor.

Figure 10:
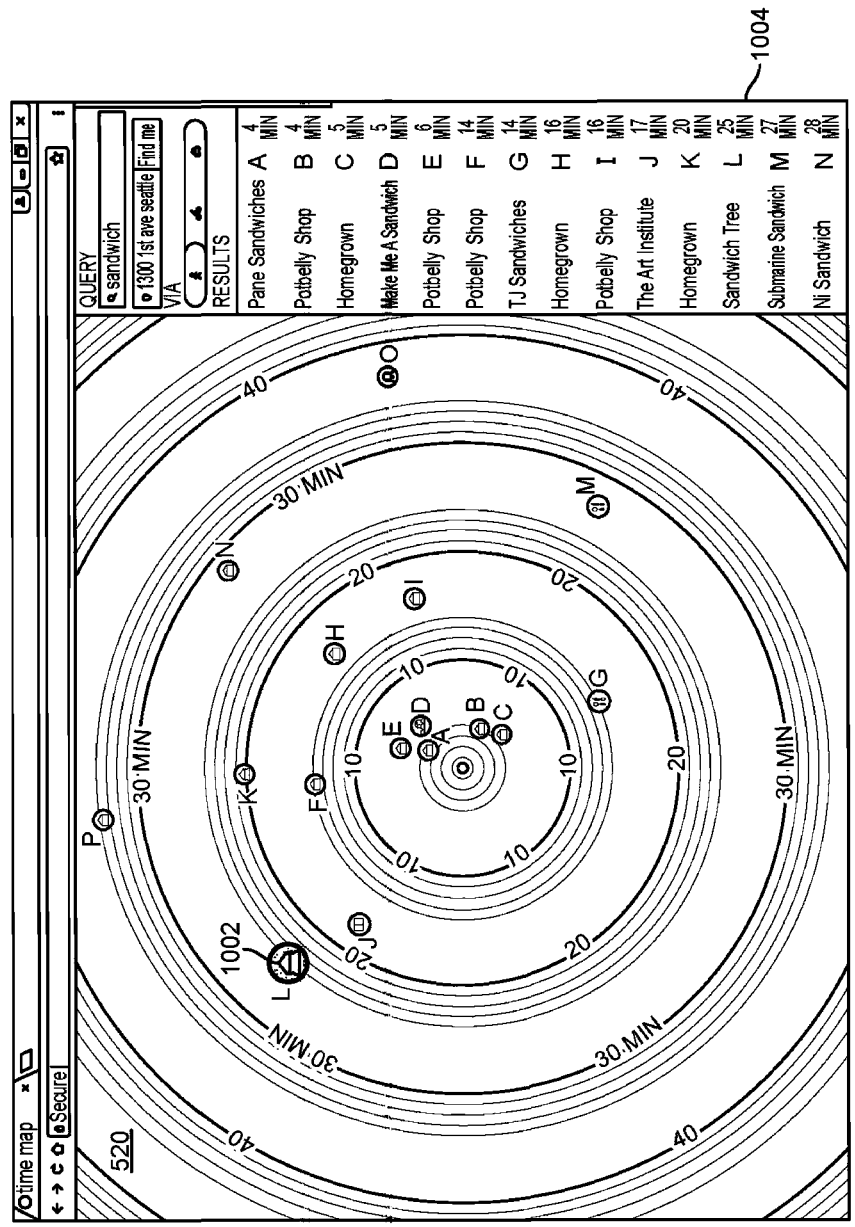
FIG. 10 illustrates selecting a destination in the graphical user interface of an example implementation, according to one embodiment.

FIG. 10 illustrates selecting a destination in the graphical user interface of an example implementation, according to one embodiment. In the example captured by FIG. 10, the user has selected destination graphical element 1002 from within the map display region 520. A selected destination graphical element can be distinguished from other destination graphical elements by changes to one or more graphical features, including a change in size, a change in coloration, a change in shape, or so on. In the example captured by FIG. 10, the selected destination graphical element 1002 is larger than the other destination graphical elements and comprises a speckle pattern not found in the other destination graphical elements. Selection of destination graphical element 1002 acts similarly to selection of listed destination graphical element 1004. Selection may comprise the user placing a cursor over the graphical element and clicking a button, for example, on a computer mouse communicatively coupled to the system. In an embodiment, the distinguishing changes to one or more graphical features of the selected destination graphical element occur when the user hovers, e.g. with a cursor, over the relevant destination graphical element.

Figure 11:
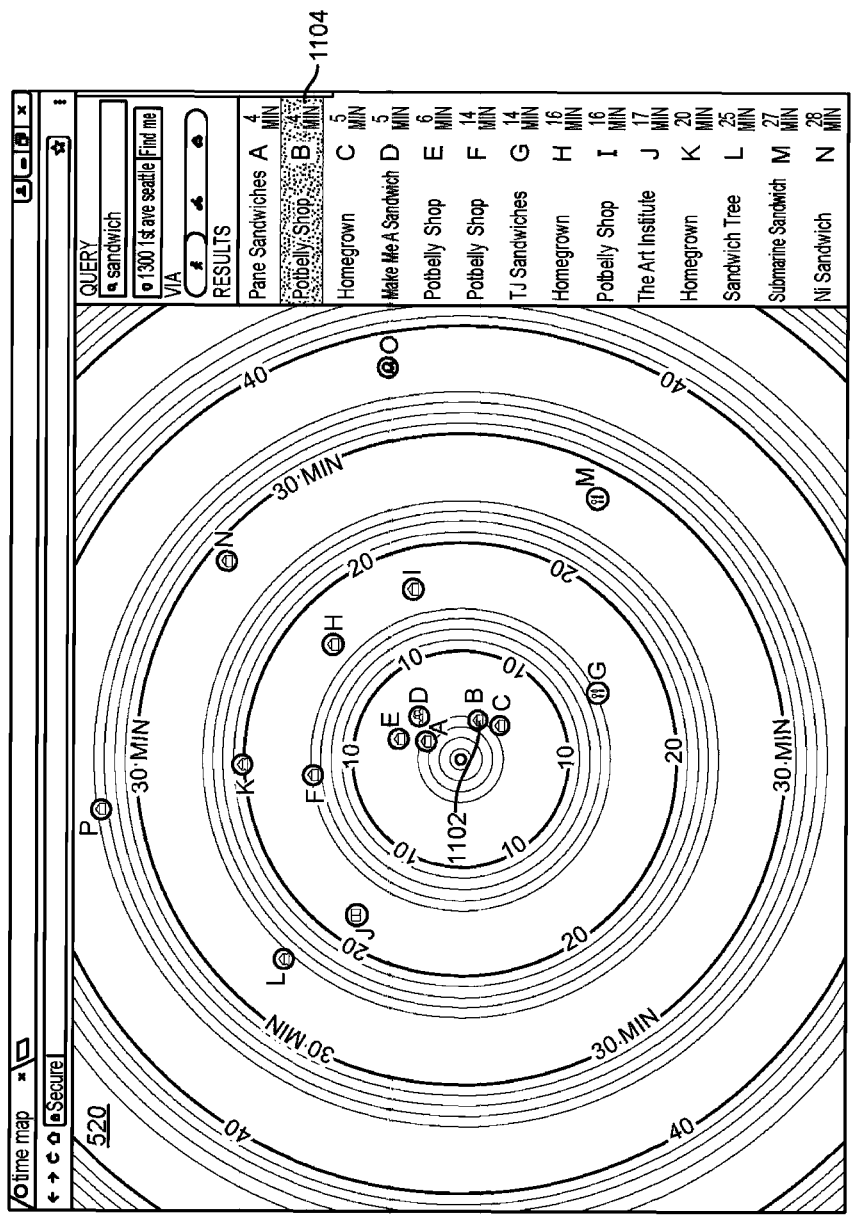
FIG. 11 illustrates selecting a destination in the graphical user interface of an example implementation, according to another embodiment.

FIG. 11 illustrates selecting a destination in the graphical user interface of an example implementation, according to another embodiment. In the example captured by FIG. 11, the user has selected listed destination graphical element 1104. Like the selected destination graphical element of FIG. 10, the selected listed destination graphical element 1104 can be distinguished from other listed destination graphical elements by changes to one or more graphical features, including a change in size, a change in coloration, a change in shape, or so on. In the example captured by FIG. 11, the selected listed destination graphical element 1104 comprises a speckle pattern not found in the other destination graphical elements. Selection of listed destination graphical element 1104 acts similarly to selection of destination graphical element 1102. Selection may comprise the user placing a cursor over the graphical element and clicking a button, for example, on a computer mouse communicatively coupled to the system. In an embodiment, the distinguishing changes to one or more graphical features of the selected listed destination graphical element occur when the user hovers, e.g. with a cursor, over the relevant listed destination graphical element.

IV.A. Destination Selection Process

Selection of an element representing a geographical destination, whether it be a destination graphical element or a listed destination graphical element, begins process 400. Returning to FIG. 4, at 410, the time map module 115 identifies user selection of a destination. User selection of a destination comprises selection of either a destination graphical element or a listed destination graphical element, as described supra. Selection of an element representing a geographical destination causes the time map module 115 to identify the geographical destination associated with the graphical element.

At 420, the time map module 115 determines a set of directions and a corresponding graphical geographic representation. The time map module 115 uses the reference geographical location and the geographical destination identified at 410 as a starting point and an ending point, respectively, for the set of directions, which the time map module 115 then constructs using electronic map data 130. A set of directions comprises one or more instructions to lead the user from one place to another. In some embodiments the constructed set of directions is optimized, for example, to minimize travel time, or alternatively to minimize tolls, e.g. toll roads, bridges, etc. Once the set of directions is determined, a corresponding graphical geographic representation is determined. The graphical geographic representation comprises a graphical representation of set of directions, such as a set of lines corresponding with the set of directions. For example, a set of directions comprises instructions to walk along three streets, and the graphical geographic representation comprises a line for each street of the three streets, each line fitting to a geographic map to overlay the corresponding street on the geographic map.

A geographic map is a symbolized image of geographical reality, representing selected features or characteristics to capture spatial relationships. As a time map is a temporal representation of features of an area, a geographic map is a spatial representation of an area. Where on a time map the placement of a graphical element relative to another captures the travel time between the two, on a geographic map the placement of a graphical element relative to another captures the spatial distance between the two.

At 430, the time map module 115 generates for display within the map display region a geographic map. The generated geographic map overlays or replaces the time map in the map display region 520 once generated. The graphical geographic representation is placed upon the generated geographic map to represent the spatial movements necessary to travel from the reference geographical location to the geographical destination. At this step the time map module 115 also generates a directions graphical element for display within the action display region 540. Depending upon the embodiment, the generated geographic map adjusts the area represented in the map display region 520 to capture fully the graphical geographic representation, shrinking or growing the area represented to fit the graphical geographic representation to the map display region. The generated geographic map may comprise both the geographic map area necessary to fit the graphical geographic representation and a padding on each side, where the padding comprises additional geographic map area to allow the user to better orient using the map. In an embodiment, the user may switch between the time map and geographic map, for example, by selecting a back button on the GUI using a cursor. Furthermore, upon return to the time map, the time map may resume its initial position with the reference geographical location centered.

Figure 12:
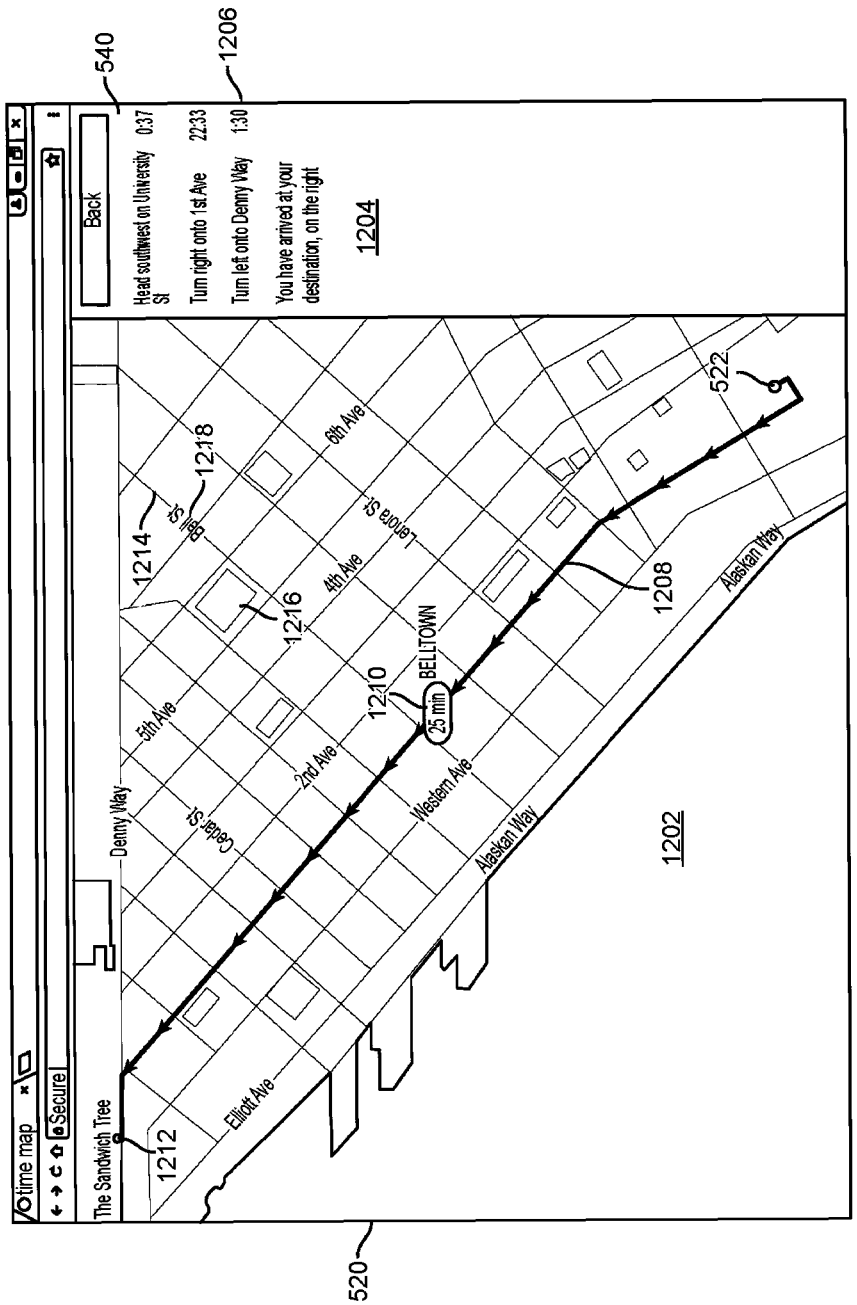
FIG. 12 illustrates a geographical map in the graphical user interface of an example implementation, according to one embodiment.

At 440, the system displays the generated geographic map and the graphical geographic representation of the set of directions within the map display region 520. The system also displays the directions graphical element within the action display region 540. FIG. 12 shows one embodiment exemplifying the overall GUI 500 at this step and its comprising regions and elements therein.

V. Geographical Map Features

FIG. 12 illustrates a geographical map 1202 in the graphical user interface of an example implementation, according to one embodiment. The generated geographic map 1202 is within the map display region 520 and a graphical geographic representation of the set of directions 1208 is displayed upon it. The reference graphical element 522 and a selected destination graphical element 1212 are displayed upon the generated geographic map 1202 and the graphical geographic representation 1208 graphically connects them. In this embodiment the graphical geographic representation 1208 comprises a travel time label 1210, a set of lines, and a plurality of arrowheads placed along the set of lines, facing along the line towards the destination graphical element 1212. Depending upon the embodiment graphical elements including the reference graphical element 522, the destination graphical element 1212, and the graphical geographic representation 1208 can comprise more or less or different graphical features than those of FIG. 12.

The geographical map 1202 comprises graphical elements representing the geographic features of the area the map represents, which may comprise roads, buildings, bodies of water, land masses, and so on. For example, road graphical element 1214 comprises a line upon the map, and building graphical element 1216 comprises a rectangle upon the map. In an embodiment, some or all roads graphically represented in the geographical map 1202 comprise labels of the road names. For example, road graphical element 1214 comprises label "Bell St." In an embodiment, elevation is represented by contour lines and/or by application of a color shading technique to the map.

In the action display region 540 is displayed a listed set of directions 1204 which lists each direction of the set of directions. Each direction as listed in the listed set of directions 1204 comprises descriptive language and may comprise a travel time representing how long that direction is estimated to take the user to travel. For example, listed direction 1206 comprises descriptive language "Turn left onto Denny Way" and travel time "1:30" which implies the user is estimated to walk one minute and thirty seconds along Denny Way at that direction of the set of directions.

Figure 13:
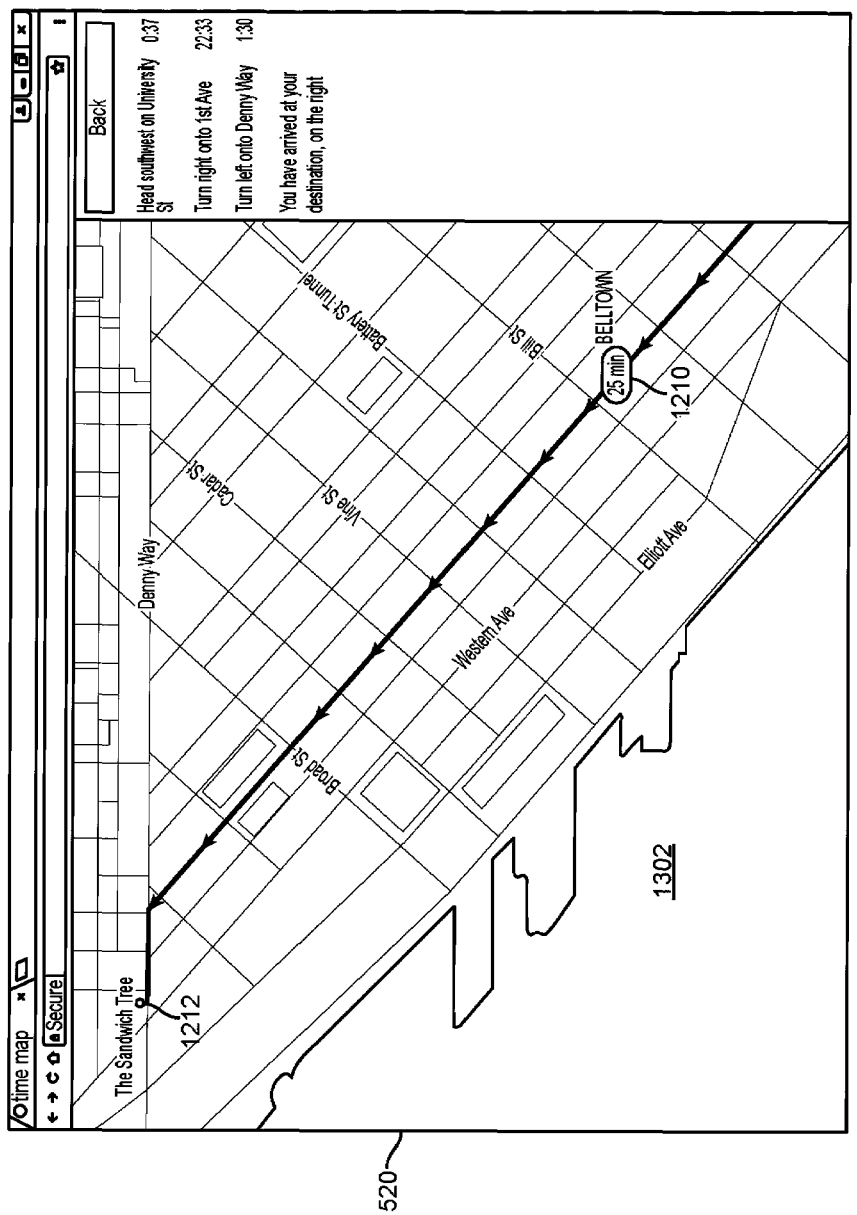
FIG. 13 illustrates panning and zooming features in a geographical map in the graphical user interface of an example implementation, according to one embodiment.

FIG. 13 illustrates panning and zooming features in a geographical map in the graphical user interface of an example implementation, according to one embodiment. Panning, zooming in, and zooming out act similarly within the map display region when the geographic map 1302 is displayed as when the time map is displayed, and for the sake of brevity shall not be detailed again. As seen in the example captured by the figure, the map display region 520 while displaying a geographic map 1302 has been zoomed in and panned to display a closer view of a geographic area near the geographic destination represented by destination graphical element 1212. Features of the graphical geographic representation which remain within the map display region 520 remain visible, such as the travel time label 1210. Upon panning, graphical elements of the geographic map which were not previously displayed may become displayed, if the map display region adjusts to encompass an area in which those graphical elements reside. In an embodiment, zooming in causes greater detail in the form of additional graphical elements, for example additional building graphical elements, to be displayed, and zooming out causes fewer detail in the form of fewer displayed graphical elements.

VI. Additional Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for displaying location information on a display of an electronic device as part of a graphical user interface (GUI), the method comprising:
   accessing a reference geographical location;
   receiving a set of geographical destinations, each destination of the set of destinations comprising a name and a location;
   determining a set of travel times between the reference geographical location and each of the locations associated with the destinations in the set; and
   generating for display in a map display region of the graphical user interface:
      a reference graphical element visualizing the reference geographical location;
      a set of isochrone graphical elements surrounding the reference graphical element, the placement of each isochrone graphical element within the map display region relative to the reference graphical element visually representing a travel time between the reference geographical location and any geographical locations located that travel time away from the reference geographical location; and
      a set of destination graphical elements, the placement of each destination graphical element within the map display region relative to the reference graphical element and the isochrone graphical elements visually representing the travel time associated with each corresponding geographical destination.

2. The method of claim 1, wherein a first isochrone graphical element of the set of isochrone graphical elements is placed nearest to the reference graphical element, wherein a second isochrone graphical element of the set of isochrone graphical elements is placed farthest from the reference graphical element, and wherein each other isochrone graphical element is placed such that a fixed distance separates it from two, nearest, other isochrone graphical elements of the set.

3. The method of claim 1, wherein each isochrone graphical element of the set of isochrone graphical elements corresponds with one or more destination graphical elements of the set of destination graphical elements, the placement of each isochrone graphical element within the map display region representing the travel time to the one or more corresponding destination graphical elements.

4. The method of claim 1, wherein the map display region may be panned in at least one direction on the plane of the map display region, responsive to an action of a user input device.

5. The method of claim 1, wherein the map display region may be modified to draw a representation of a larger area responsive to a first action of a user input device, and to draw a representation of a smaller area responsive to a second action of the user input device.

6. The method of claim 1, further comprising:
   generating for display in an action display region of the graphical user interface a set of actionable graphical elements, each actionable graphical element enabling a type of interaction with the elements of the map display region.

7. The method of claim 6, wherein a first actionable graphical element comprises a change location field, the change location field changing the reference geographical location, responsive to one or more actions of a user input device.

8. The method of claim 6, wherein a first actionable graphical element comprises a specify destination field, the specify destination field changing the set of destinations of the map display region responsive to one or more actions of a user input device.

9. The method of claim 6, wherein a first actionable graphical element comprises a transportation field, the transportation field changing the travel time associated with each isochrone graphical element responsive to one or more actions of a user input device to select a method of transportation.

10. The method of claim 1, further comprising:
    responsive to an action of a user input device, determining a set of directions from the reference geographical location to a first destination, and a geographical representation of the set of directions; and
    generating for display in the map display region a geographical map, the geographical map comprising the geographical representation of the set of directions.

11. The method of claim 10, wherein displaying the geographical map is bound to the geographical representation of the set of directions, the geographical map resizing to encompass the geographical representation of the set of directions.

12. The method of claim 10, wherein the action of the user input device comprises selection of the first destination graphical element displayed within the map display region.

13. The method of claim 10, wherein the action of the user input device comprises selection of the first destination from a destination list comprising the set of destinations.

14. The method of claim 1, wherein the set of isochrone graphical elements comprises a set of circles of varying radii centered on the reference graphical element.

15. The method of claim 14, wherein each destination graphical element of the set of destination graphical elements further comprises a bearing, wherein placing each destination graphical element within the map display region is also relative to the bearing of the destination graphical element with reference to the reference graphical element.

16. The method of claim 1, wherein the set of isochrone graphical elements comprises a line and a set of demarcations, each demarcation corresponding to an isochrone graphical element, and wherein each destination graphical element of the set of destination graphical elements is placed interstitially on the line within the map display region.

17. The method of claim 6, wherein a first actionable graphical element comprises a set of directions field, the set of directions field displaying a set of directions from the reference geographical location to a first geographical destination, within the action display region.

18. The method of claim 1, wherein each isochrone graphical element comprises at least one label indicating the corresponding travel time.

19. A computer system for displaying location information on a display of an electronic device as part of a graphical user interface (GUI), comprising:
   a processor; and
   a memory to store instructions, the instructions causing the one or more processors to:
   access a reference geographical location;
   receive a set of geographical destinations, each destination of the set of destinations comprising a name and a location;
   determine a set of travel times between the reference geographical location and each of the locations associated with the destinations in the set; and
   generate for display in a map display region of the graphical user interface:
      a reference graphical element visualizing the reference geographical location;
      a set of isochrone graphical elements surrounding the reference graphical element, the placement of each isochrone graphical element within the map display region relative to the reference graphical element visually representing a travel time between the reference geographical location and any geographical locations located that travel time away from the reference geographical location; and
      a set of destination graphical elements, the placement of each destination graphical element within the map display region relative to the reference graphical element and the isochrone graphical elements visually representing the travel time associated with each corresponding geographical destination.

20. A non-transitory computer-readable storage medium that stores instructions, which when executed by one or more processors, causes a computing system of the one or more processors to perform operations that include:
   accessing a reference geographical location;
   receiving a set of geographical destinations, each destination of the set of destinations comprising a name and a location;
   determining a set of travel times between the reference geographical location and each of the locations associated with the destinations in the set; and
   generating for display in a map display region of the graphical user interface:
      a reference graphical element visualizing the reference geographical location;
      a set of isochrone graphical elements surrounding the reference graphical element, the placement of each isochrone graphical element within the map display region relative to the reference graphical element visually representing a travel time between the reference geographical location and any geographical locations located that travel time away from the reference geographical location; and
      a set of destination graphical elements, the placement of each destination graphical element within the map display region relative to the reference graphical element and the isochrone graphical elements visually representing the travel time associated with each corresponding geographical destination.

* * * * *